United States Patent
Herley

(10) Patent No.: US 11,165,804 B2
(45) Date of Patent: Nov. 2, 2021

(54) DISTINGUISHING BOT TRAFFIC FROM HUMAN TRAFFIC

(71) Applicant: Microsoft Technology Licensing, LLC, Redmond, WA (US)

(72) Inventor: Cormac E. Herley, Bellevue, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 169 days.

(21) Appl. No.: 16/427,081

(22) Filed: May 30, 2019

(65) Prior Publication Data

US 2020/0382535 A1 Dec. 3, 2020

(51) Int. Cl.
*H04L 29/06* (2006.01)
*G06F 21/55* (2013.01)
*H04L 29/08* (2006.01)

(52) U.S. Cl.
CPC ........ *H04L 63/1425* (2013.01); *G06F 21/554* (2013.01); *H04L 63/1441* (2013.01); *H04L 67/02* (2013.01); *H04L 67/22* (2013.01); *H04L 2463/144* (2013.01)

(58) Field of Classification Search
CPC . H04L 63/1425; H04L 63/1441; H04L 67/02; H04L 67/22; H04L 2463/144; G06F 21/554
See application file for complete search history.

(56) References Cited

U.S. PATENT DOCUMENTS

| | | | |
|---|---|---|---|
| 7,698,548 | B2 | 4/2010 | Shelest et al. |
| 9,398,035 | B2 | 7/2016 | Vasseur et al. |
| 9,674,207 | B2 | 6/2017 | Di Pietro et al. |
| 2008/0127335 | A1 | 5/2008 | Khan et al. |
| 2011/0072516 | A1 | 3/2011 | Cohen et al. |
| 2012/0030750 | A1* | 2/2012 | Bhargava ........... H04L 63/1416 726/13 |
| 2015/0326587 | A1 | 11/2015 | Vissamsetty et al. |
| 2016/0191554 | A1 | 6/2016 | Kaminsky |
| 2017/0324757 | A1* | 11/2017 | Al-Shaer ............. H04L 63/1433 |
| 2018/0108015 | A1* | 4/2018 | Rogas .................. G06F 16/955 |

(Continued)

FOREIGN PATENT DOCUMENTS

| | | |
|---|---|---|
| CN | 105553998 A | 5/2016 |
| WO | 2018129595 A1 | 7/2018 |
| WO | 2018146480 A1 | 8/2018 |

OTHER PUBLICATIONS

"International Search Report and Written Opinion Issued in PCT Application No. PCT/US2020/026035", dated Jul. 21, 2020, 13 Pages.

(Continued)

*Primary Examiner* — Abiy Getachew

(57) ABSTRACT

Web traffic at different geographic traffic distribution buckets are compared against each other to try and machine-learn the underlying traffic parameters of legitimate (human-initiated) traffic. Distributions of the traffic parameters for the web traffic at multiple servers are compared to see whether they match. If so, matching or substantially matching traffic parameters signal that such web traffic is, in fact, legitimate. A clean profile is built with the matching traffic parameters and used to determine how much bot traffic is resident in web traffic at different servers.

20 Claims, 8 Drawing Sheets

(56) References Cited

U.S. PATENT DOCUMENTS

2018/0343280 A1* 11/2018 McQueen ............... H04L 63/08

OTHER PUBLICATIONS

Zabihimayvan, et al., "A Soft Computing Approach for Benign and Malicious Web Robot Detection", In Journal of Expert Systems with Applications, vol. 87, Nov. 30, 2017, pp. 129-140.

Devi, et al., "Detection of Application Layer DDoS Attacks Using Information Theory Based Metrics", In Proceedings of the Second International Conference on Computer Science, Engineering and Application, May 2012, pp. 217-223.

Xu, et al., "Continuous Time Bayesian Networks for Host Level Network Intrusion Detection", In Proceedings of the Joint European Conference on Machine Learning and Knowledge Discovery in Databases, Sep. 15, 2008, pp. 613-627.

* cited by examiner

DISTINGUISHING BOT TRAFFIC FROM HUMAN TRAFFIC

BACKGROUND

The proliferation of the Information Age has brought a near-constant barrage of cyber-attacks on today's online resources. Websites, online applications, and web servers are prime targets for attacks like standardized query language (SQL) injection attacks, cross-site scripting (XSS) attacks, malware, phishing attacks, distributed denial of service (DDoS) attacks, and the like. The sheer breadth of today's cyber-attacks becomes particularly difficult to manage as more and more applications move into cloud environments that host a multitude of disparate web resources.

Traditionally, there have been two approaches for protecting web resources against malicious cyber-attacks: (1) the web resource (e.g., application, site, server, etc.) may be made more resilient to cyber-attacks; and (2) intrusion detection systems (IDSes) and firewalls identify malicious traffic being routed to hosting servers. The first approach leaves the management of cyber security to web developers, who are generally ineffective at keeping up with the latest cyber-attacks. While there are a host of techniques that may be used to make web applications and sites more resilient to modern cyber-attacks, most developers are not cybersecurity experts. And even if they are, very few have the ability to continually stay ahead of tomorrow's cyber-attacks.

Conventional IDSes and firewalls typically work by examining web requests (e.g., Hypertext Transfer Protocol (HTTP) requests) and applying rules to help filter out illegitimate traffic from legitimate traffic before the requests get to a server for processing. Network traffic that traverses the firewall is matched against rules to determine if the traffic should be allowed to proceed to the servers. Most of the available schemes attempt to detect attacks by comparing packet information (e.g., Internet Protocol (IP) address) and commands in the web request for previously identified suspicious metadata. This requires constant vigilance and maintenance of such identifying metadata, which is generally ineffective because attackers may easily change devices, locations, schemes, and the like to perpetrate cyber-attacks.

SUMMARY

The disclosed examples are described in detail below with reference to the accompanying drawing figures listed below. The following summary is provided to illustrate some examples disclosed herein. It is not meant, however, to limit all examples to any particular configuration or sequence of operations.

Examples disclosed herein are directed to applying machine-learning techniques to learn the underlying traffic parameters submitted by humans instead of bots to different traffic distribution buckets or categories (e.g., server locations). In this vein, the disclosed embodiments access traffic distributions associated with the web traffic received at the different traffic distribution buckets. The traffic distributions include the one or more traffic parameters, and the traffic distributions of different servers are compared to determine whether any are the same or substantially the same (e.g., with a 0-10% threshold). If the distribution of web traffic of at least two (for example) geographically different traffic distribution buckets are the same, or substantially matching, an assumption is made that these two distributions represent the distribution of traffic parameters for human (or legitimate) web traffic. These matching parameter distributions may then be used to determine how much the web traffic at any given server location is bot-initiated (illegitimate) and how much is human-initiated (legitimate).

BRIEF DESCRIPTION OF THE DRAWINGS

The disclosed examples are described in detail below with reference to the accompanying drawing figures listed below.

DETAILED DESCRIPTION

Figure 1:
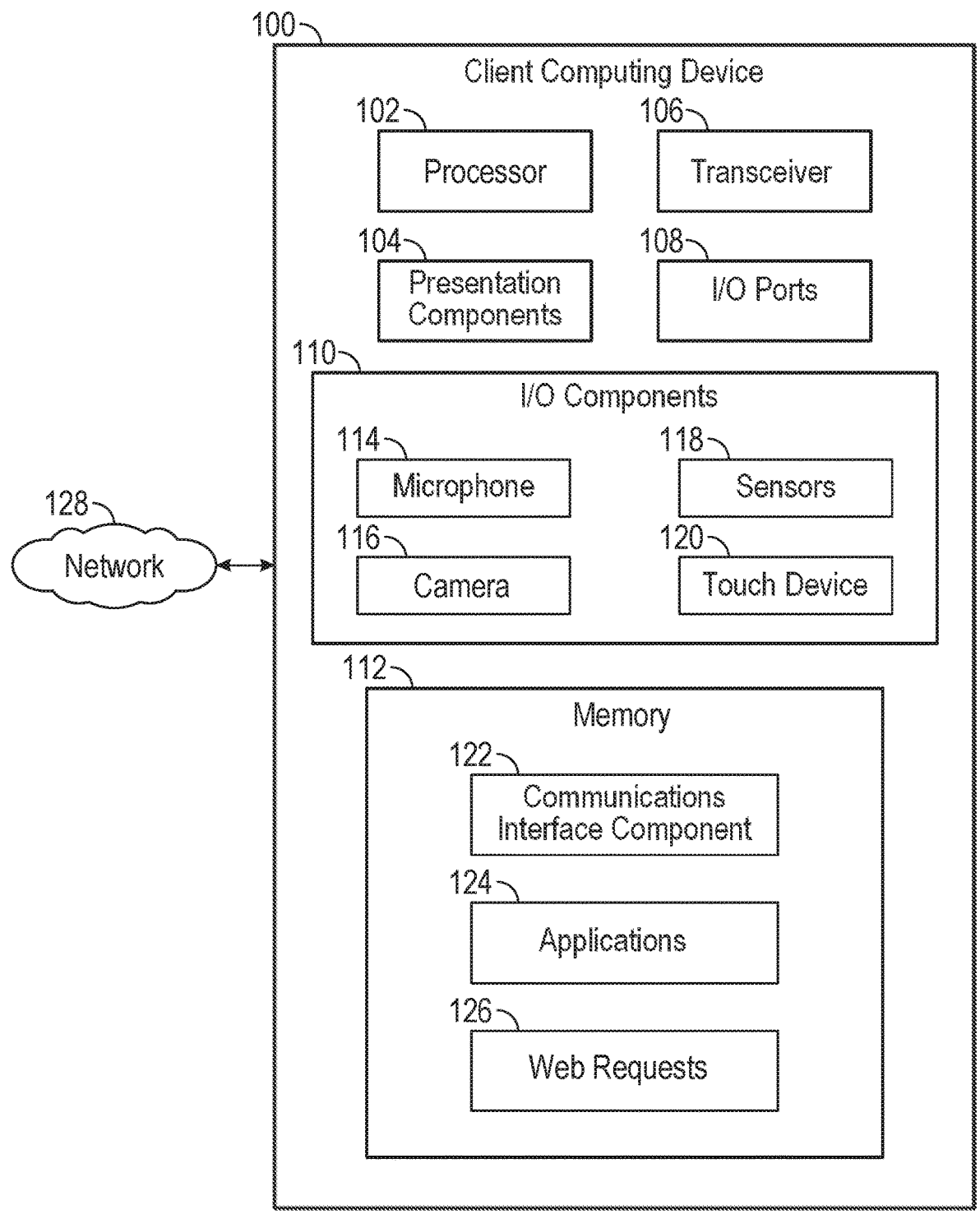
FIG. 1 is a block diagram of a client computing device configured for requesting and transmitting web traffic.

The various embodiments will be described in detail with reference to the accompanying drawings. Wherever possible, the same reference numbers will be used throughout the drawings to refer to the same or like parts. References made throughout this disclosure relating to specific examples and implementations are provided solely for illustrative purposes but, unless indicated to the contrary, are not meant to limit all examples.

Embodiments and examples disclosed herein are directed toward systems, methods, and computer-executable storage memory embodied with instructions for using artificial intelligence (AI) to machine-learn what percentage—or ratio—of web traffic at various server locations is legitimately being requested by humans and what percentage is maliciously being requested by machines (or "bots"). To do so, the distribution of web traffic at (for example) various server locations are compared against each other—without any predetermined assumptions—to identify similar web traffic at multiple server locations. Equally, the distribution of traffic from various browser versions, or at various times of day, or to particular pages or sub-services might be compared against each other. Unlike conventional firewalls and IDS systems that use lists of traffic parameters that have been blacklisted as malicious (e.g., IP address), the disclosed embodiments take a different approach by examining the actual traffic at different server locations to machine-learn the traffic parameters of clean (or human) web traffic. Once those traffic parameters are learned, the web traffic at servers may be analyzed to calculate how much of the web traffic is originating from humans and how much is originating from bots. As mentioned below, the human traffic is considered to be legitimate (or "clean") and the bot traffic is considered to be illegitimate.

While disclosed in more detail below, the embodiments referenced herein determine the traffic parameters of human traffic by comparing data sets of web traffic received at different server locations. An assumption is made that human traffic has the same distribution of traffic parameters at different server locations. For example, servers receiving all human traffic in Atlanta, Ga have shown to have the same (or substantially the same) traffic parameters as severs in Redmond, Wash. Learning what human traffic looks like at one server location is usable to estimate the amount of web traffic at another server location that is bot traffic. Such estimations of the amount of human and bot traffic at server locations may be used to block web traffic, prioritize traffic with higher probabilities of being human traffic, trigger deeper server diagnostics, or the like.

Having generally described an overview of some of the disclosed embodiments, some key definitions are provided to aid the reader. "Web traffic" refers to requests submitted over a network (e.g., the Internet) to one or more servers for processing. These may include HTTP requests, and examples include, without limitation, HTTP requests for accessing websites; online applications (e.g., e-mail accounts, bank accounts, news sources, social media, fitness, weather, etc.); online documents (e.g., word processing, spreadsheets, etc.); web-enabled and Internet of Things (TOT) devices; or the like.

"Human traffic" refers to web requests originating from a human. Often, this disclosure refers to human traffic as "clean" traffic, meaning that traffic originating from a human is likely to be legitimate web traffic. Conversely, the "bot traffic" refers to web traffic requested by a machine, which is implied to be illegitimate and likely to be a cyber-security threat (e.g., phishing, malware, SQL injection, DDoS, XSS, zero-day exploit, man-in-the-middle, and other types of attacks). That said, not all bot traffic is malicious. For example, web crawlers, scripts transmitting telemetry data, and other standard types of requests may be machine-initiated but not malicious. Such data may be filtered out of the data sets of web traffic analyzed by the components and techniques disclosed when attempting to identify the traffic profile for clean traffic.

"Traffic parameters" refer to the metadata and data of the web requests in the web traffic. Examples of such metadata include, without limitation, IP address, user agent (e.g., browser), time of day, uniform resource identifier (URI), server location, request sender location, and the like. Examples of such data include, without limitation, text entered in submitted forms (e.g., name, address, zip code of someone signing up for an e-mail address); data for authentication tests (e.g., CAPTCHA); biometric authentication data (e.g., iris, fingerprint, face, etc.); document data; or any other data sent to online and cloud-based applications.

A "distribution of traffic parameters" refers to a quantity of the web traffic parameters received at a server location. A distribution of traffic parameters may include one or multiple web traffic parameters. For example, distribution traffic parameters may indicate the number of web requests sent to a server location with a particular type of browser, such as the INTERNET EXPLORER® web browser or a particular version thereof. In another example, the distribution of traffic parameters may include the version type of browser, time of day, and geographic location of a server receiving the web traffic. This disclosure frequently references "traffic distribution" and "traffic distribution buckets," both of which refer to categories of the distribution of traffic parameters. For instance, a traffic distribution bucket may include the web traffic received at a server location at different times, via different web browsers, or from different geographic locations.

A "traffic profile" refers to a quantity of one or more traffic parameters that are associated with human (or clean) traffic or bot (or illegitimate) traffic. As discussed in more detail below, human traffic may have several parameters in particular quantities. For example, human traffic may have a traffic profile made up particular percentages of different web browsers day (e.g., 20% INTERNET EXPLORER® version 11, 14% CHROME® version 71, 10% SAFARI®, etc.); quantity of data at different times of day (e.g., 1 million requests per second (RPS) at 2 pm, 1.3 million RPS at 3 pm, etc.); quantity of data at different server locations (e.g., 0.5 million RPS in Atlanta, GA; 0.7 million RPS in Seattle, Wash.; 0.3 million RPS in Madison, Wis., etc.). In some embodiments, the traffic profile includes traffic parameters that are not correlated to each other in order to provide multiple dimensions that can be analyzed by using the AI and machine-learning techniques discussed herein. Following the above example, the split of web browsers in human traffic should be consistent at different locations irrespective of the amount of traffic at different times of day. Similarly, data quantities at different times of day and at different server locations should be consistent from day to day regardless of the browsers of the web traffic. A traffic profile may include one or more uncorrelated traffic parameters and is used as a signature of the traffic parameters for human traffic.

Having generally provided an overview of some of the disclosed examples, attention is drawn to the accompanying drawings to further illustrate some additional details. The illustrated configurations and operational sequences are provided for to aid the reader in understanding some aspects of the disclosed examples. The accompanying figures are not meant to limit all examples, and thus some examples may include different components, devices, or sequences of operations while not departing from the scope of the disclosed examples discussed herein. In other words, some examples may be embodied or may function in different ways than those shown.

FIG. 1 is a block diagram that illustrates a client computing device 100 configured for requesting and transmitting web traffic. The client computing device 100 represents any device executing instructions (e.g., as application programs, operating system functionality, or both) to implement the operations and functionality described herein associated with the computing device 100. In some examples, the client computing device 100 has at least one processor 102, one or more presentation components 104, a transceiver 106, one or more input/output (I/O) ports 108, one or more I/O components 110, and computer-storage memory 112.

The I/O components 110 may include various input and/or output components, such as, for example but without limitation, a microphone 114, camera 116, sensors 118, touch device 120, or the like. Also, the computer-storage memory 112 is embodied with machine-executable instructions comprising a communications interface component 122, various applications 124, and web requests 126 that are transmittable over a network 128 that are each executable by the processor 108 to carry out the disclosed functions below.

The client computing device 100 may take the form of a mobile computing device or any other portable device, such as, for example but without limitation, a smart phone, laptop, tablet, computing pad, netbook, gaming device, and/or portable media player. The client computing device 100 may also include less portable devices such as a desktop, personal computer, kiosk, tabletop device, or the like.

The processor 108 may include any quantity of processing units, and is programmed to execute computer-executable instructions for implementing aspects of the disclosure. The instructions may be performed by the processor or by multiple processors within the computing device, or performed by a processor external to the computing device.

The presentation components 104 visibly or audibly present information on the client computing device 100. Examples of presentation components 104 include, without limitation, computer monitors, televisions, projectors, touch screens, phone displays, tablet displays, wearable device screens, televisions, speakers, vibrating devices, and any other devices configured to display, verbally communicate, or otherwise present data to users.

The transceiver 106 is an antenna capable of transmitting and receiving radio frequency ("RF") signals. One skilled in the art will appreciate and understand that various antennae and corresponding chipsets may be used to provide communicative capabilities between the client computing device 100 and other remote devices. Examples are not limited to RF signaling, however, as various other communication modalities may alternatively be used.

I/O ports 108 allow the client computing device 100 to be logically coupled to other devices and I/O components 110, some of which may be built into client computing device 100 while others may be external. The microphone 114 captures audio. The camera 116 captures images or video. The sensors 126 may include any number of sensors, for example, without limitation, an accelerometer, magnetometer, pressure sensor, photometer, thermometer, global positioning system ("GPS") chip or circuitry, bar scanner, biometric scanner (e.g., fingerprint, palm print, blood, eye, or the like), gyroscope, near-field communication ("NFC") receiver, or any other sensor configured to capture data from a user or environment.

The touch device 120 may include a touchpad, track pad, touch screen, other touch-capturing device capable of translating physical touches into interactions with software being presented on, through, or by the presentation components 104. The illustrated I/O components 110 are but one example of I/O components that may be included on the client computing device 100. Other examples may include additional or alternative I/O components 118, e.g., a sound card, a vibrating device, a scanner, a printer, a wireless communication module, or any other component for capturing information related to the user or the user's environment.

The computer-storage memory 112 includes any quantity of memory associated with or accessible by the client computing device 100. The memory 112 may be internal to the client computing device 100 (as shown in FIG. 1), external to the client computing device 100 (not shown), or both (not shown). Examples of memory 112 include, without limitation, random access memory (RAM); read only memory (ROM); electronically erasable programmable read only memory (EEPROM); flash memory or other memory technologies; CDROM, digital versatile disks (DVDs) or other optical or holographic media; magnetic cassettes, magnetic tape, magnetic disk storage or other magnetic storage devices; memory wired into an analog computing device; or any other medium for encoding desired information and for access by the client computing device 100.

Memory 112 may also take the form of volatile and/or nonvolatile memory; may be removable, non-removable, or a combination thereof; and may include various hardware devices (e.g., solid-state memory, hard drives, optical-disc drives, etc.). Additionally or alternatively, the memory 112 may be distributed across multiple devices, e.g., in a virtualized environment. For the purposes of this disclosure, "computer storage media," "computer-storage memory," and "memory" do not include carrier waves or propagating signaling.

Instructions stored in memory 112 include, without limitation, the communications interface component 122, various applications 124, and web requests that are generated by the various applications 124 for transmission over the network 128. In some examples, the communications interface component 130 includes a network interface card and/or a driver for operating the network interface card. Communication between the client computing device 100 and other devices may occur using any protocol or mechanism over a wired or wireless connection, or across the network 106.

Examples of applications 124 include chat, instant messaging, electronic-mail application, web browser, social media, and other types of programs. The applications 124 may communicate with counterpart applications or services such as web services accessible via the network 128. For example, the applications 124 may include client-operating applications that correspond to server-side applications executing on remote servers or computing devices in the cloud.

Through the applications 124, users or bots may generate web requests 126 to access online resources, such as web sites and online applications. The web requests 126 may take the form of HTTP requests that request access to different online resources and may submit data thereto. For example, one web request 126 may attempt to sign up for a particular e-mail address through an online application. Another may be a request to a banking application with appropriate login credentials (e.g., username, password, biometric information). Still another may be sent access a website or social media application. Myriad different web requests 126 may be generated and transmitted from the client computing device 100. Illegitimate requests 126 may be generated via scripts executed by different bots, and clean (or human) web requests 126 may generated by a user.

The web requests 126 are transmitted over the network 128 to servers hosting the requested online resources. The web requests 126 include various data, such as, for example but without limitation, the IP address of the client computing device 100, the web browser (and browser version) used to transmit the request, the time of day, the form data (e.g., login credentials), sensor data, the videos/images/audio, touch inputs, biometrics, permission data, social media credentials, or any other user- or device-specific data that may be transmitted over the network 128.

The network 128 may include any computer network, for example the Internet, a private network, local area network (LAN), wide area network (WAN), or the like. The network 106 may include various network interfaces, adapters, modems, and other networking devices for communicatively connecting the client computing devices 100 to the server locations described in more detail below. The network 106 may also include configurations for point-to-point connections. Computer networks are well known to one skilled in the art, and therefore do not need to be discussed at length herein.

Figure 3:
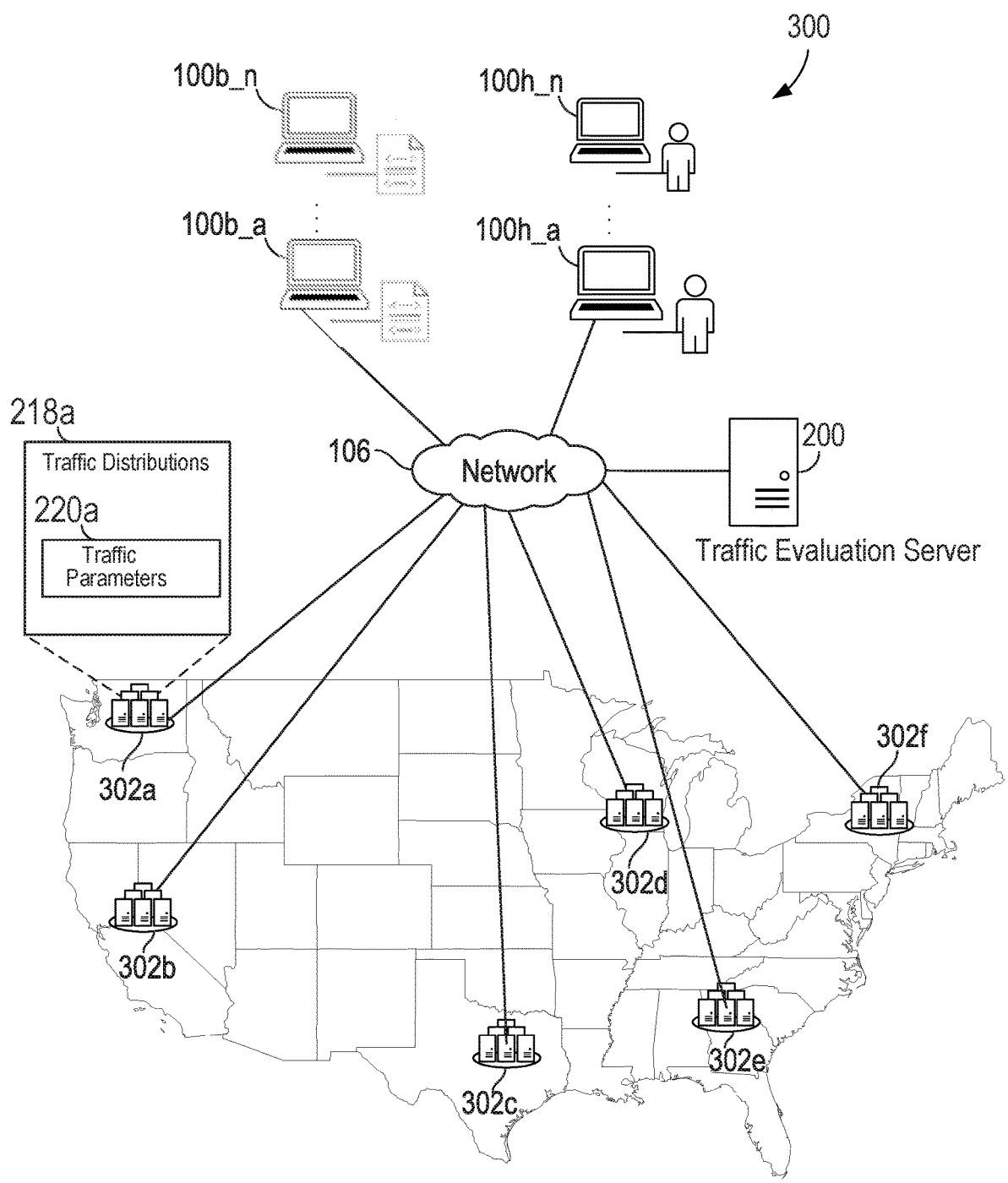
FIG. 3 is a block diagram of a networking environment in which an example evaluation server is configured to determine the amount of bot and human web traffic at various traffic distribution buckets.
Figure 8:
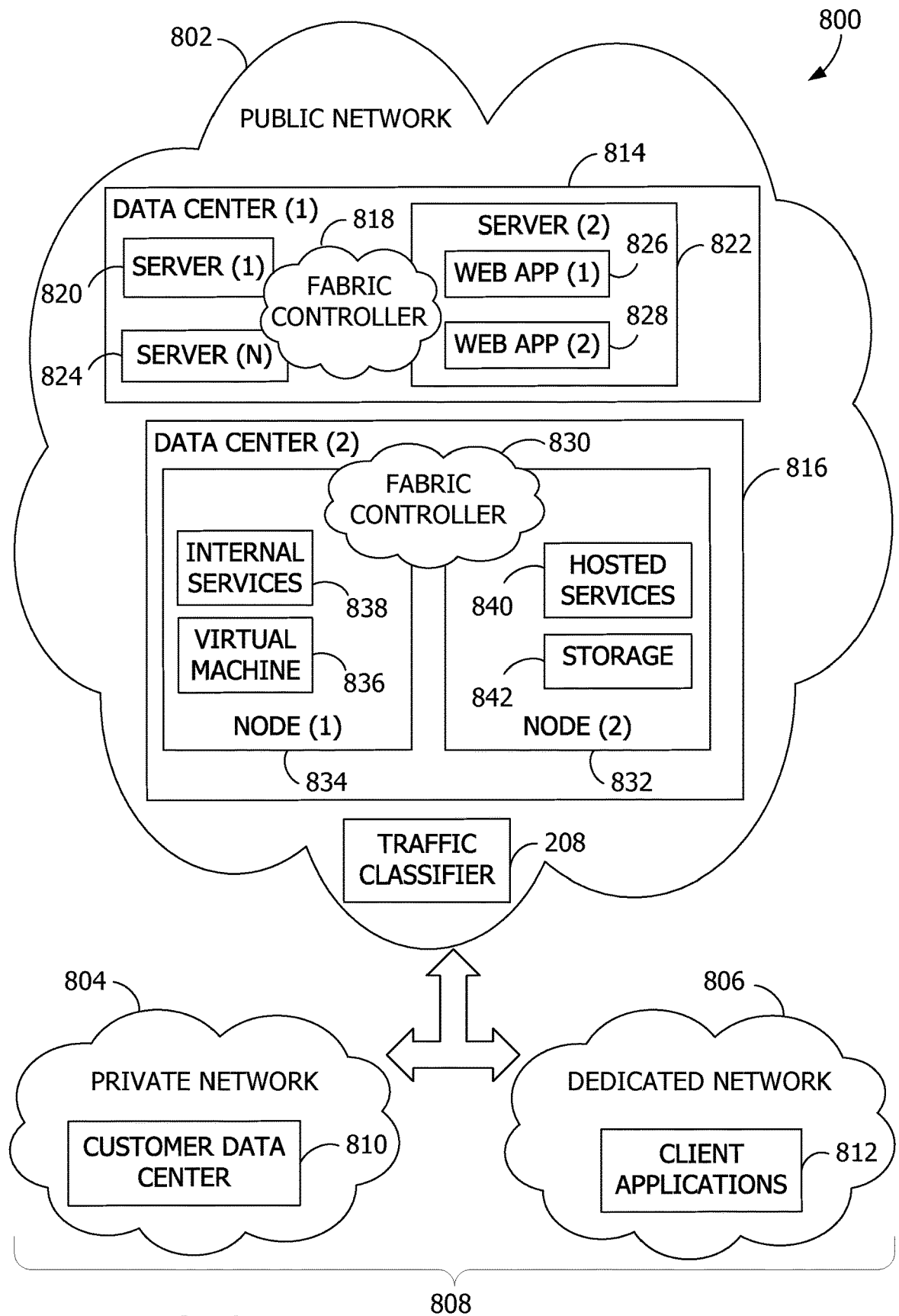
FIG. 8 illustrates a block diagram of an example cloud-computing environment in which web traffic data is distinguished between human and bot traffic.

As discussed in more detail below in reference to FIG. 3, the web requests 126 may be routed to and processed servers in a cloud environment that are hosting the requested online resources (e.g., websites, applications, data, etc.). FIG. 3 shows different cloud farms located geographically at different places. FIG. 8 provides a sample architecture of a cloud computing environment in which the servers processing the web requests 126 are organized.

Figure 2:
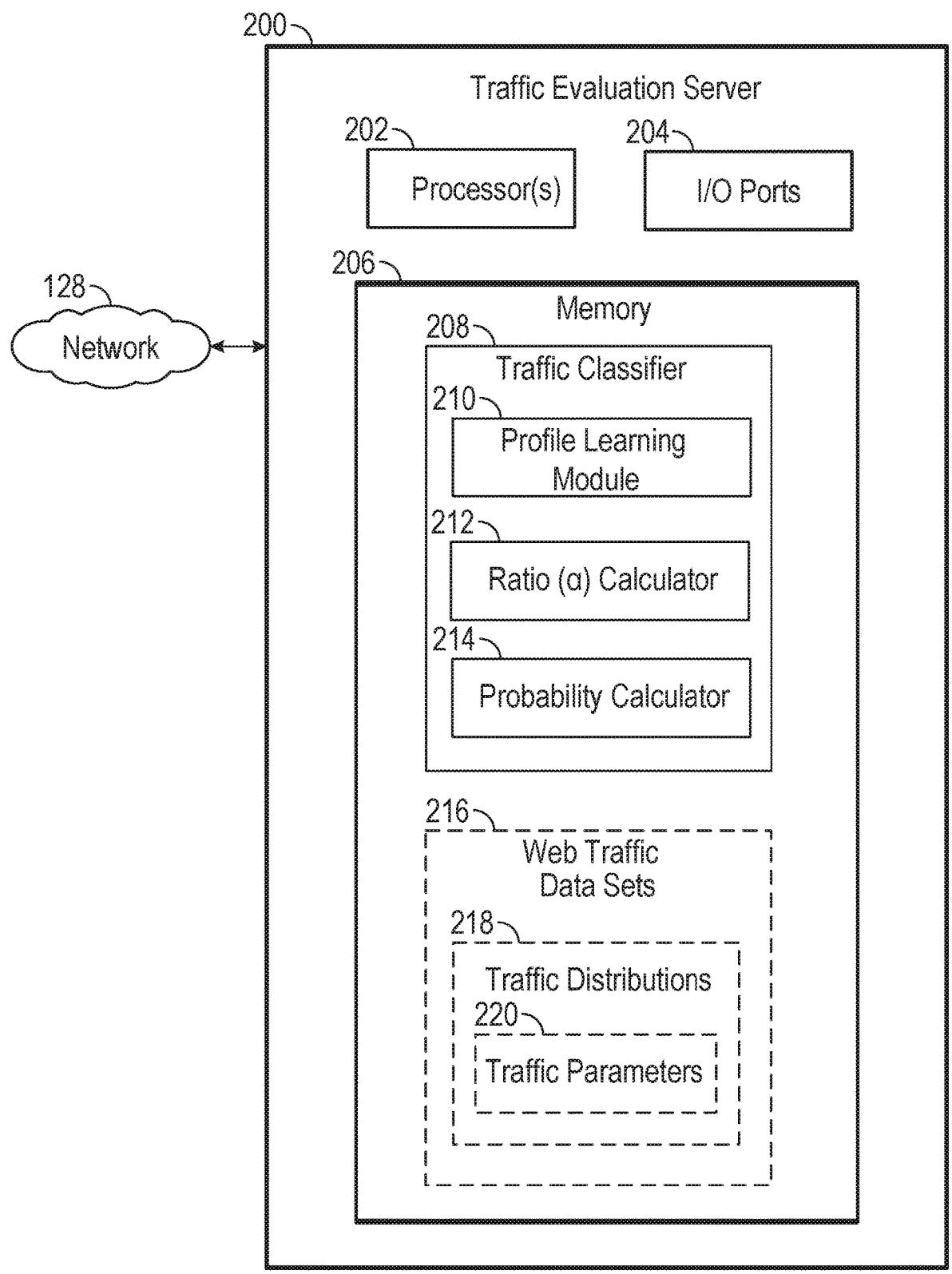
FIG. 2 is a block diagram of an example evaluation server configured to machine-learn the traffic profile of human web traffic and determine the amount of bot and human web traffic at various traffic distribution buckets.

FIG. 2 is a block diagram of an example evaluation server 200 configured to machine-learn the traffic profile of human web traffic and determine the amount of bot and human web traffic at various server locations. The traffic evaluation server 200 includes, or has access to, one or more processors 202, I/O ports 204, and computer-storage memory 206. Embodied on memory 206 are executable instructions that include, inter alia, a traffic classifier 210 and web traffic data sets 216. The traffic classifier 208 includes executable instructions for a profile learning module 210, a ratio calculator 212, and a probability calculator 214. And the web traffic data sets 216 include traffic distributions 218 and their underlying traffic parameters 220 for web traffic at one or more server locations.

While depicted as a standalone computing device, in actuality, the traffic evaluation server 200 may take the form of a web service that is hosted on one or more cloud computing resources. For instance, processors(s) 202 may consist of a host of processing resources spread across different servers, virtual machines (VMs), or the like. The same may be said for the I/O ports 204 and the memory 206. Thus, embodiments are not limited to a single server device as the traffic evaluation server 200. Instead, some embodiments include the embodied instructions of the traffic classifier 208 in a cloud environment, such as the cloud environment shown in FIG. 8.

The traffic classifier 208 represents instructions executable by the processor(s) 202 for identifying an amount, probability, or ratio of web traffic at server locations that are human (legitimate) versus bot (illegitimate). In some embodiments, data sets of the web traffic from different server locations (shown as "web traffic data sets 216") are analyzed by the traffic classifier 208 to learn the traffic profile of human traffic ("the clean profile"). More specifically, the clean profile refers to a particular distribution of traffic parameters that are determined to represent, or model, human traffic at server locations.

The traffic classifier 208 only needs to find the clean profile in order to then identify the quantity of bot traffic at different server locations. To show this, consider that various traffic parameters that are logged at different server locations include features x, y, and z. Each feature may then be divided into respective buckets $x_0, x_1, \ldots x_n$; $y_0, y_1, \ldots y_n$; and $z_0, z_1, \ldots z_n$. The distribution of observations, O(x, y, z) for a given set is then a mixture of clean, C(x, y, z), and bot, B(x, y, z), web traffic. The bot and clean web traffic for a given server location may then be expressed in the following manner:

$$O(x,y,z) = \alpha * C(x,y,z) + (1-\alpha) * B(x,y,z);$$

where $\alpha$ defines the ratio of clean to bot traffic and is represented as $0 \leq \alpha \leq 1$. The probabilities of clean and bot traffic may be thought of as normalized histograms (e.g., summing to one). The distribution of a single feature may be identified so long as feature's distribution is summed to one. For example, O(y) is just the normalized histogram along y, i.e., $O(y|x=x_i)$ is just the normalized histogram of y for the events where $x=x_i$.

The traffic classifier 208 identifies the clean profile for human data without any previously known knowledge of the distribution of the x, y, and z traffic parameters. In other words, C(x, y, z), B(x, y, z), and $\alpha$ are not known at the outset, and therefore the amounts of clean and bot traffic cannot be determined. To figure out the odds that a particular observation (x, y, z) is malicious, Baye's theorem provides the following:

$$\frac{P(mal \mid x, y, z)}{P(\overline{mal} \mid x, y, z)} = \frac{P(x, y, z \mid mal)}{P(x, y, z \mid \overline{mal})} \cdot \frac{P(mal)}{P(\overline{mal})}$$

$$= \frac{O(x, y, z) - \alpha \cdot C(x, y, z)}{(1-\alpha) \cdot C(x, y, z)} \cdot \frac{1-\alpha}{\alpha}$$

Using the above equations, one can see that the probabilities of web traffic at a given server for clean (C) versus being bot traffic (B) equating to:

$$P(mal|x,y,z) = B(x,y,z)$$

$$P(\overline{mal}|x,y,z) = C(x,y,z)$$

This indicates that the clean profile of traffic, C(x, y, z) and $\alpha$ are all that is needed for the traffic classifier 208 to determine the amount of bot traffic ((B(x, y, z)) in an observed distribution (O(x, y, z)) of web traffic.

Assuming traffic features are independent of each other in the clean distribution (such as, for example, x being the browser version, y being the time of day, and z being the metro location of a server receiving the web traffic), then C(x, y, z)=C(x) C(y) C(z)), and there may be anywhere from 0 to N sub-features per traffic feature. Ten features (a-j), for instance, may have an aggregate of 200 or so different sub-features. A "sub-feature" refers to some distribution of a traffic features. For example, there may be 30 different metro regions, 20 different browser versions, 24 hours per day, etc. Every logged traffic feature will then be a 10-tuple and the number of possible tuples will be much larger than the number of sub-features (e.g., 10 features each with 20 sub-features would give 200 buckets, but $20^{10}$ possible tuples).

Some sub-features may have very little or no traffic. Others may have substantial amounts. Thus, bot or attack traffic may not evenly be spread across all features or their respective sub-features. For example, some server locations may experience more feature and sub-feature traffic at some metro locations and little or none at others. Attackers may have more bandwidth to connect to Sunnyvale, Calif. or Chicago, Ill but very little in Knoxville, Tenn. Or attackers may versions of CHROME® and FIREFOX® browsers but neglect some versions of SAFARI®, OPERA®, or BRAVE®. Suppose the $x=x_i$ sub-features are not attacked. This means that $B(y|x=x_i)=0$. And the observation of x given y then becomes:

$$O(y|x=x_i) = \alpha \cdot C(y|x=x_i) = \alpha C(x_i) \cdot C(y).$$

Because $\alpha$ C($x_i$) is just a constant, the clean distribution of y can be found. This may similarly be performed for z and the rest of the features (except x). That is, an un-attacked sub-feature in x gives (up to a constant) the clean distribution of all the other features. For example, if attackers forget about version 72 of the CHROME® browser, do not have any access in Tennessee, or do not bother to send any traffic to a particular website or web-page or sub-service, the clean distribution of all but one of the traffic features is sitting in traffic parameters 220.

Following the example above, suppose that traffic parameters $x=x_i$ and $z=z_j$ are legitimate (human). Both give estimates for the distribution for traffic parameter y, that is:

$$O(y|x=x_i) = \alpha C(x_i) \cdot C(y); \text{ and}$$

$$O(y|z=z_j) = \alpha C(z_j) \cdot C(y).$$

So there are two independent estimates of C(y), but it cannot yet be determined what traffic parameter is clean. Yet, all clean traffic parameters will point to the same distribution: the clean version C(y). If two buckets give the same distribution, then either: (1) both contain only clean traffic, (2) both contain only bot traffic, or (3) bot traffic has the same distribution as clean traffic in those buckets. The embodiments disclosed herein dismiss option (3), because if the bot is sending web traffic with the same traffic distribution as human traffic, no predictive model will work. With only options (1) and (2) left, the profile learning module 210 is used to find traffic distributions at different server locations that are very close in some measure and then assume that such traffic is all human.

In some embodiments, the traffic classifier 208 includes a profile learning module 210, a ratio calculator 212, and a probability calculator 214. The profile learning module 210 accesses the web traffic data sets 216 from geographically different server locations to find patterns of web traffic from which to learn the traffic profile of human traffic. Again, the web traffic data sets 216 comprise the web traffic at those remote server locations. The accessed web traffic data sets 216 may include any logged traffic parameters 220 of web traffic received at the server locations, such as, for example but without limitation, IP address, user agents (e.g., browser and browser version), time of day, URIs, server locations, request sender locations, text for submitted forms, data for authentication tests, biometric authentication data, document data, or any other data logged from web traffic requests. These traffic parameters 220, in some embodiments, are stored (or logged) as traffic distributions 218. For example, the web traffic at three separate server locations in Seattle, Wash.; Atlanta, Ga.; and Chicago, Ill may have traffic distributions 218 the number of traffic requests received from certain browsers, sent at various times of day, and having particular form data.

The profile learning module 210 compares these traffic distributions 218 of the Seattle, Atlanta, and Chicago server locations to try and identify received traffic parameters 220 that are similar (e.g., same or substantially the same percentages of different browsers sending the web requests). In some embodiments, the profile learning module 210 learns the clean profile of traffic parameters 220 by finding two or more server locations that are receiving the same, or substantially the same, traffic distribution 218.

Once the clear profile is found by the profile learning module 210, the ratio calculator 212 applies computes the previously discussed α for the web traffic at server locations to determine how much of the web traffic is likely human and how much is likely bot. Again, α is the ratio of clean to bot traffic for a given data set of web traffic. Bots can only add web traffic, increasing the amount observed in any traffic distribution bucket. Web traffic is never decreased by bot traffic. The Bayes theorem equation may then be simplified to the following:

$$(1-\alpha) \cdot B(y) = O(y) - \alpha \cdot C(y) \leq 0.$$

Thus, a lower bound on α is given by the largest amount of C(y) that may be subtracted from O(y) while still keeping the content of all of the traffic distribution buckets positive:

$$\alpha \leq \operatorname*{argmax}_{\alpha}\{O(y_k) - a \cdot C(y_k) \geq 0 \forall\, y_k\}.$$

Determining the cleanest signal consistent with the web traffic that was actually observed ends up being the following:

$$\alpha \leq \min_{y_k} \frac{O(y_k)}{C(y_k)}.$$

Then, if one of the y traffic parameters in the traffic distributions is human (e.g., $y_0$), equality is reached:

$$\alpha = O(y_0)/C(y_0).$$

Assuming several human traffic parameters across all traffic features, the ratio calculator 212 computes different estimates of a for different server locations, giving everything that is needed to calculate the odds of any traffic parameter x, y, z at a given server location being bot-initiated.

An ratio α for each server location may be determined, indicating how much of a particular server location's web traffic is bot-initiated. Some embodiments go further and use the probability calculator 214 to determine a probability that new web traffic is bot or human, using α and/or the clean profile. In some embodiments, the probability calculator 214 assigns a probability to new web traffic requests indicating a likelihood that the request is bot (or illegitimate) based on the α determined for the respective server location and/or the clean profile that was learned by the profile learning module 210. If α indicates the server location has seen significantly high amounts of bot traffic, the new web request may be assigned a probability score indicating an increased risk of illegitimacy than if the server's α value were indicated more human traffic at the server location. Thus, α may be used be used to assign probability scores to new web traffic.

Additionally or alternatively, new web traffic may be assigned probability scores indicate likelihood of being bot traffic based on the traffic parameters of the new web traffic differing from the traffic parameters of the clean profile. For example, if the clean profile indicates a certain amount of traffic occurring at some time in the day, and a new web traffic request is received during that time but when the level of web traffic is multiple times higher than the clean profile, the probability calculator 214 may assign a probability score to this new web request indicating it is likely bot-generated, and thus malicious. Thus, the clean profile itself may be used to assign probability scores to new web traffic.

In some embodiments, the probability scores are used in server firewalls to block traffic. Additionally or alternatively, the probability scores may be used to prioritize processing of traffic. For example, web traffic that is more likely human-initiated may be prioritized over traffic that is more-likely bot. The probability scores may be used in numerous other ways, far too many to list here. But it should be reiterated that the probability scores, in some embodiments, are generated from the clean profile learned through various web traffic data sets 216.

FIG. 3 is a block diagram of a networking environment 300 in which an example evaluation server 200 is configured to determine the amount of bot and human web traffic at various server locations 302a-f. Server locations 302a-f are geographically positioned at different locations around the United States. Each server location 302 represents a public cloud environment that receives web traffic for accessing various online resources. One example of a public cloud infrastructure is described below in more detail in relation to FIG. 8. Only six server locations 302 are shown in FIG. 3. Far more server locations 302 analyzed by the traffic evaluation server 200.

Web traffic from a plurality of client computing devices 100 are submitting web traffic that is being routed to the server locations. The web traffic is being submitted by a mixture of bots and humans, as shown by client computing devices 100$b\_a$-100$b\_n$ (for bot submissions) and client computing devices 100$h\_a$ to 100$h\_n$ (for human submissions). As previously mentioned, these client computing devices (bot and human) submit web traffic requests, such as HTTP requests, that attempt to access an online resource hosted in the servers at the various server locations 302$a$-$f$.

Each of the server locations 302$a$-$f$ have their own respective web traffic routed thereto. Traffic parameters 220 and traffic distributions 218 for such web traffic are logged at the various server locations and shared, or otherwise exposed, to the traffic evaluation server 200. For the sake of simplicity, the only traffic parameters 220$a$ and traffic distributions 218$a$ at server location 302$a$ are shown, but every server location has its own traffic parameters 220 and traffic distributions 218.

In some embodiments, the traffic evaluation server 200 analyzes the traffic distributions 218 for the server locations 302$a$-$f$. By comparing the traffic distributions 218 at the disparate server locations 302 to each other, the profile learning module 210 of the traffic evaluation server 200 identifies traffic distributions 218 at different server locations that are the same or, at least substantially similar. These identified traffic distributions 218 are used to learn the clean profile of traffic parameters across all server locations, because the same traffic profile at multiple server locations is likely coming from legitimate human traffic, as opposed to bots.

Once identified, the clean profile for web traffic is then used by the ratio calculator 212 of the evaluation server 200 to compute the ratio ($\alpha$) of clean traffic to bot traffic at any of the server locations. Optionally, the probability calculator 214 of the evaluation server 200 computes probabilities that new traffic received at the various server locations are human-requested or bot-requested, using either the clean profile, a, or a combination thereof. Such probabilities may be used by firewalls, IDSes, or other security applications to block incoming web traffic that is likely to be bot traffic. Additionally or alternatively, the probability scores may be used to prioritize processing of certain web requests over others—e.g., human web traffic gets processed before bot traffic.

Figure 4:
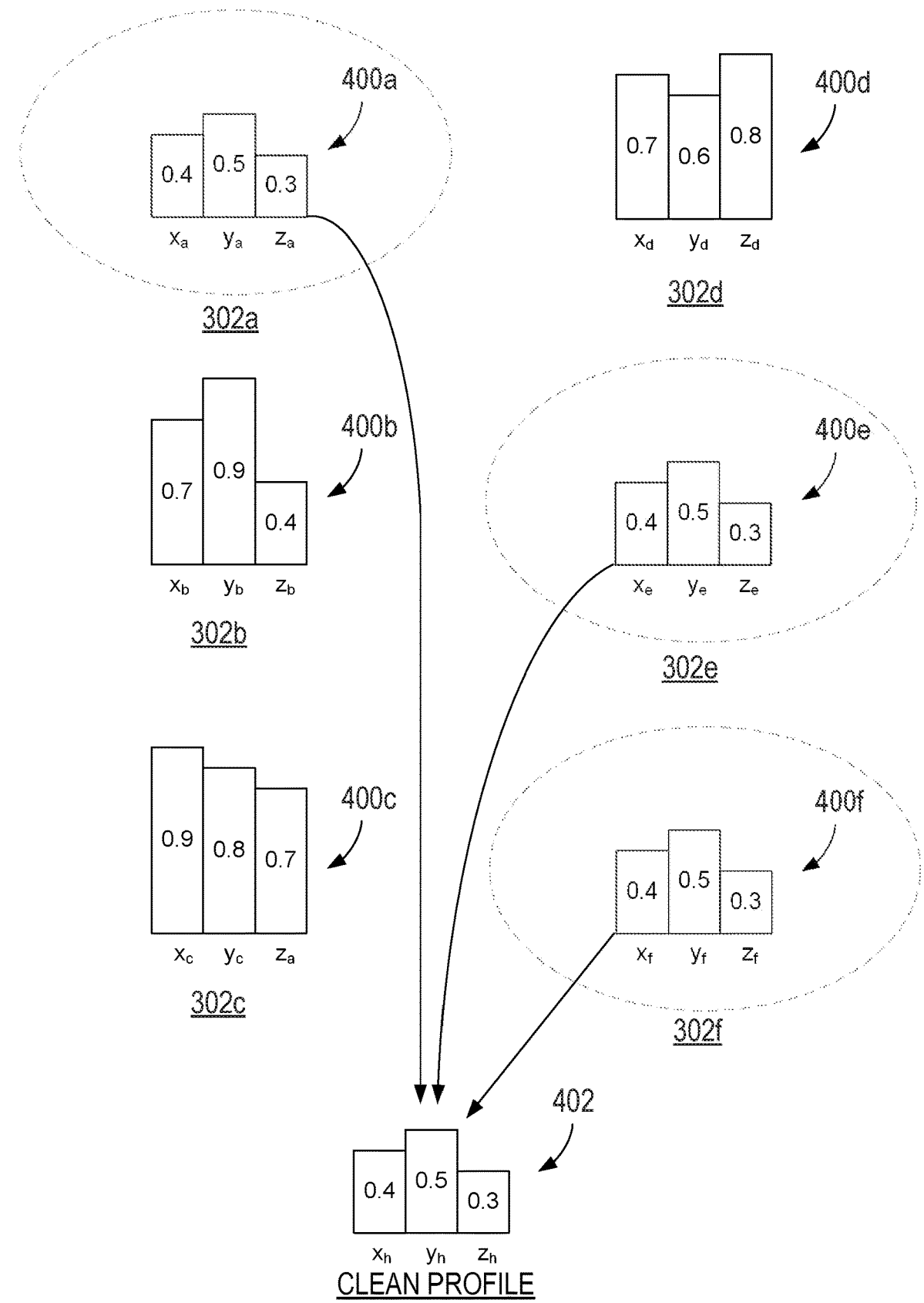
FIG. 4 illustrates several graphical diagrams of traffic distributions for several traffic parameters associated with web traffic logged at various traffic distribution buckets for use in machine-learning the profile of human web traffic.

FIG. 4 illustrates several graphical diagrams of traffic distributions 400$a$-$f$ for multiple traffic parameters (x, y, z) associated with web traffic logged at various server locations 302$a$-$f$ for use in machine-learning the clean profile 402 of human web traffic. The traffic distributions 400$a$-$f$ are shown in FIG. 4 as three logged traffic parameters (x, y, z) that are logged at each of the server locations 302$a$-$f$. Specifically, server location 302$a$ logs traffic parameters $x_a$, $y_a$, and $z_a$. Server location 302$b$ logs traffic parameters $x_b$, $y_b$, and $z_b$. Server location 302$c$ logs traffic parameters $x_c$, $y_c$, and $z_c$. Server location 302$d$ logs traffic parameters $x_d$, $y_d$, and $z_d$. Server location 302$e$ logs traffic parameters $x_e$, $y_e$, and $z_e$. Server location 302$f$ logs traffic parameters $x_f$, $y_f$, and $z_f$. Examples of traffic parameters x, y, and z include, without limitation, the percentage of web traffic using a particular user agent (browser and browser version), the amount of web traffic sent during different times of day, the web traffic sent at a particular geographic location (e.g., city, state, metro area), or other type of traffic parameter.

The six traffic distributions 400$a$-$f$ are analyzed by the profile learning module 210 and compared to each other, attempting to find traffic distributions that match, or are substantially closed to each other (e.g., within an error threshold, such as 0-10%). As shown, traffic distributions 400$a$, 400$e$, and 400$f$ match, as indicated by the dotted ellipses. These matching, or substantially similar, traffic distributions 400$a$, 400$e$, and 400$f$ are, in some embodiments, used by the profile learning module 210 to generate the clean profile 402.

Clean profile 402 includes a traffic distribution of traffic parameters $x_h$, $y_h$, and $z_h$, which are assumed to represent web traffic from humans instead of bots. The depicted embodiment shows the clean profile 402 being generated to have the same traffic parameters as traffic distributions 400$a$, 400$e$, and 400$f$—as these traffic distributions 400 match each other. Alternatively, embodiments may average any or all of the traffic parameters x, y, z from one traffic distribution 400 to another when the traffic parameters do not exactly match but are within a particular threshold (e.g., 0-10%). For example, if traffic distribution 400$a$ includes traffic parameter $x_a$ at 0.45 and traffic distribution4 includes traffic parameter $x_e$ at 0.48, the profile learning module 210 may set $x_h$ of the clean profile 402 to the average of the two, or 0.465. Thus, exact matches are not necessary, as some of the embodiments disclosed herein may learn clean profiles with some level of differentiation between different traffic distributions 400. Virtually all server locations 302 will experience some level of bot traffic, so taking the average, mean, median, or other blending of different traffic distributions 400 to generate the clean profile 402 is used in some, though not all, embodiments.

Figure 5:
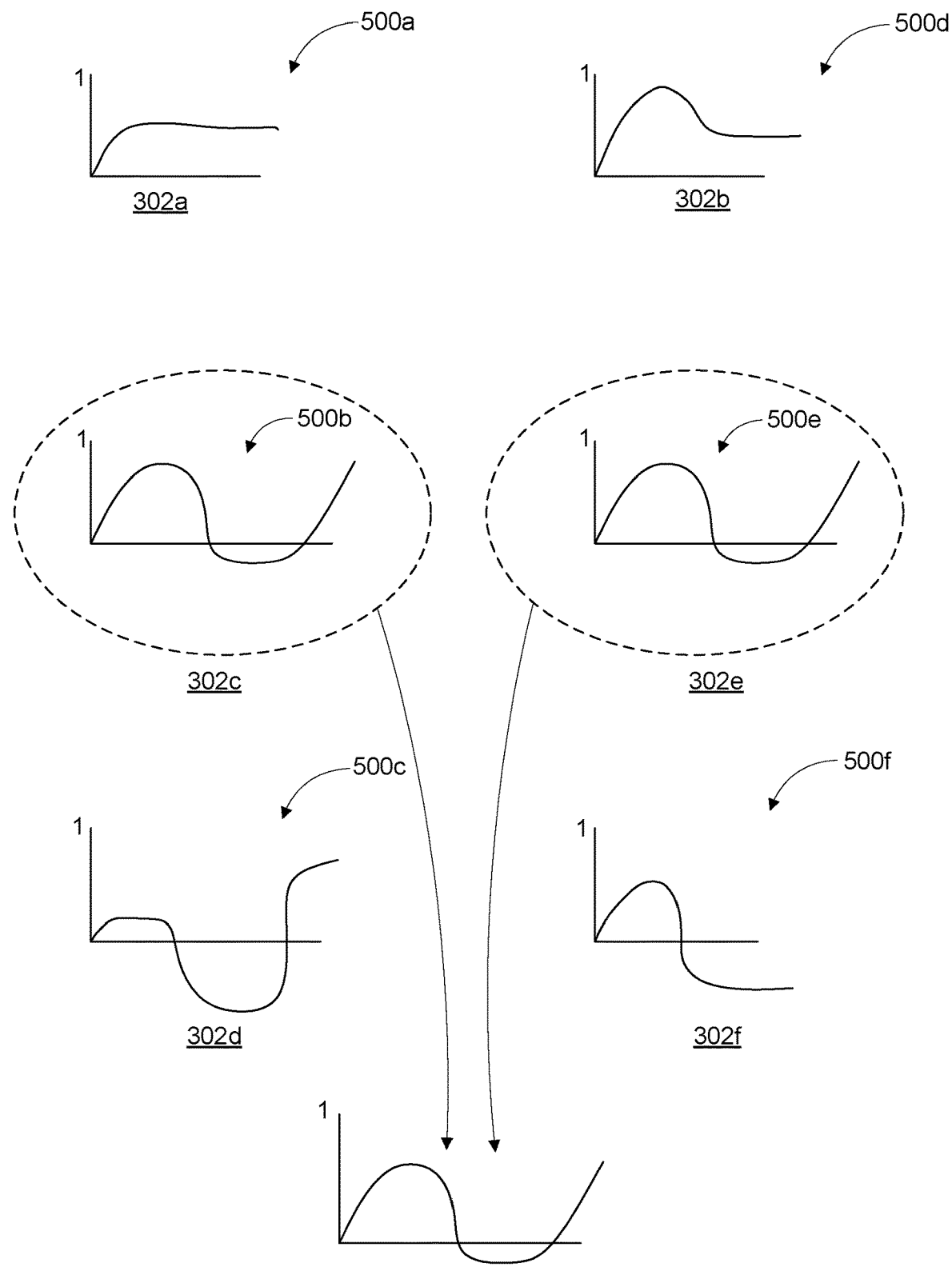
FIG. 5 illustrates several graphical diagrams of traffic distributions for a single traffic parameter associated with web traffic logged at various traffic distribution buckets for use in machine-learning the profile of human web traffic.

FIG. 5 illustrates several graphical diagrams of traffic distributions 500$a$-$f$ for a single traffic parameter (y) associated with web traffic logged at various server locations 302$a$-$f$ for use in machine-learning the clean profile 502 of human web traffic. While FIG. 4 illustrates that multiple traffic parameters (x, y, z) may be used to learn and generate a clean profile (e.g., 402), some embodiments generate a clean profile (e.g., 502) based on a single traffic parameter. To further illustrate such embodiments, traffic distributions 500$a$-$f$ show single traffic parameter y, which in this example refers to the amount of web traffic requests received at different times of day, normalized from −1 to 1. Specifically, server location 302$a$ logs traffic parameter $y_a$. Server location 302$b$ logs traffic parameter $y_b$. Server location 302$c$ logs traffic parameter $y_c$. Server location 302$d$ logs traffic parameter $y_d$. Server location 302$e$ logs traffic parameters $y_e$. Server location 302$f$ logs traffic parameters $y_f$.

The single traffic parameter in the traffic distributions 500$a$-$f$ are analyzed by the profile learning module 210 and compared to each other, attempting to find traffic distributions that match, or are substantially closed to each other (e.g., within an error threshold, such as 0-10%). As shown, traffic distributions 500$b$ and 500$e$ match, as indicated by the dotted ellipses. These matching, or substantially similar, traffic distributions 500$b$ and 500$e$ are, in some embodiments, used by the profile learning module 210 to generate the clean profile 502.

Clean profile 502 includes a traffic distribution of traffic parameter y, which is assumed to represent web traffic from humans instead of bots. The depicted embodiment shows the clean profile 500 being generated to have the same traffic parameter as traffic distributions 500$b$ and 500$e$—as these traffic distributions 500 match each other. Alternatively, embodiments may average traffic parameters y from one traffic distribution 500 to another when the traffic parameters do not exactly match but are within a particular threshold (e.g., 0-10%). Thus, exact matches are not necessary, as some of the embodiments disclosed herein may learn clean profiles with some level of differentiation between different traffic distributions 500.

Figure 6:
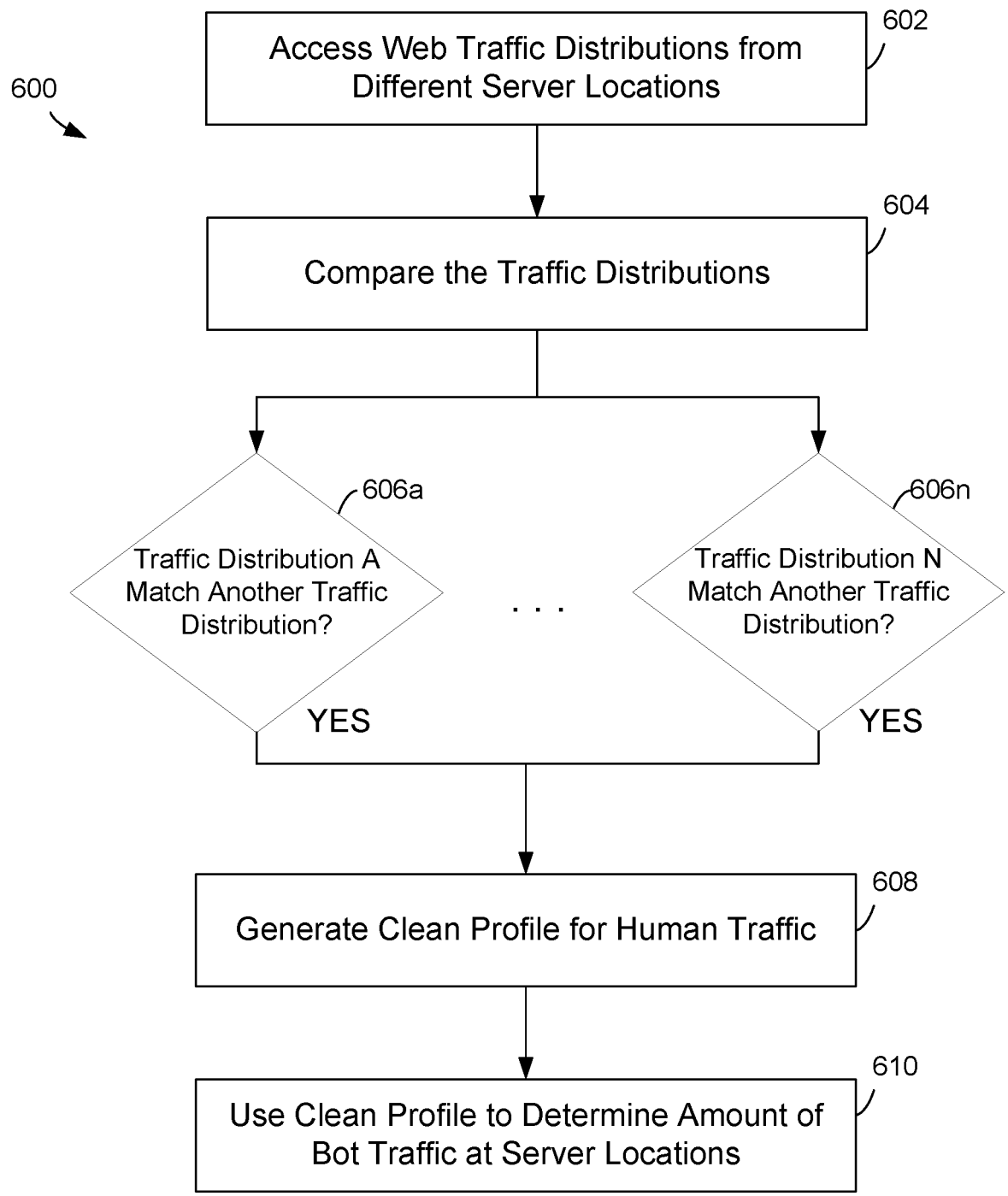
FIG. 6 is a flow chart diagram illustrating a workflow for distinguishing between bot and human web traffic on servers.

FIG. 6 is a flow chart diagram illustrating a workflow 600 for distinguishing between bot and human web traffic on servers. As shown at 602, numerous server locations are accessed, and traffic distributions associated with web traffic of the different web server locations are received. In some embodiments, logs of traffic parameters and/or traffic distributions are shared or access by the profile learning module discussed. These traffic distributions indicate the breakdown of traffic parameters for web traffic at the various server locations. For example, a server in Seattle may have web traffic with the following user agents and time-of-day breakdown: 20% to traffic using the INTERNET EXPLORER® version 10 web browser, 15% using the FIREFOX® version 4 web browser, 11% using the CHROME® version 70 web browser, 8% using the INTERNET EXPLORER® version 9 web browser, and the rest of traffic requests using other web browsers that are categorized in a "miscellaneous" bucket. Additionally, the quantity or data size of the web traffic at different times of day may be included in the traffic distribution, e.g., 1 million requests at 12:30 pm, 2 million at 1:00 pm, 2.2 million at 1:30 pm, and so forth. Myriad other traffic parameters may also be included in the traffic distributions and/or traffic parameters that are made available.

As shown at 604, the traffic distributions for at least two different server locations in separate geographic locations are compared to each other to see whether any are the same, or at least substantially similar (e.g., within a threshold of 0-10% of each other). As shown by option blocks 606a and 606n, the various traffic distributions for the different server locations A to N are checked to the see whether they match another traffic distribution. For example, in reference to FIG. 3, if the traffic distributions of server locations 302a, 302b, and 302d match have the same, or substantially the same, ratios or percentages of traffic parameters. The distribution parameters may include one or multiple traffic parameters to match, discussed in more detail in reference to FIGS. 4 and 5. Moreover, the distribution parameters for the different server locations may be checked sequentially or in parallel, the latter of which is suggested by the two decision boxes 606a and 606n being performed at the same time, as well as the ellipses therebetween signifying that the number of traffic distributions that may be compared may is expandable out to any number—through available processing resources may limit the number being processed in parallel.

If a first traffic distribution of a server location does not match, or substantially match, another the traffic distribution of another server, the first traffic distribution is not used in determining a clean profile for human traffic. Traffic distributions that do match are used to generate the clean profile for human traffic, as shown by YES paths from decision blocks 606a-n and 608. In some embodiments, the clean profile comprises a traffic distribution of traffic parameters that should be seen in data sets of human web traffic at different server locations. Embodiments assume the same proportion of traffic parameters seen at multiple server locations are likely coming from human (or legitimate) web traffic requests.

The clean profile is then used to determine the amount of bot traffic at the different server locations, as shown at 610. This may be done in a number of ways. In some embodiments, a server location's traffic distribution accessed and the traffic distribution of the clean profile ("clean distribution"), and the remaining traffic distribution determined to be the bot traffic ("bot distribution"). In other words, the clean distribution added to the bot distribution makes up the entire observed traffic distribution ("observed distribution"), so removing the clean distribution from the observed distribution, logically, reveals the bot traffic being received at the server location. This is described in more detail in FIG. 7.

Figure 7:
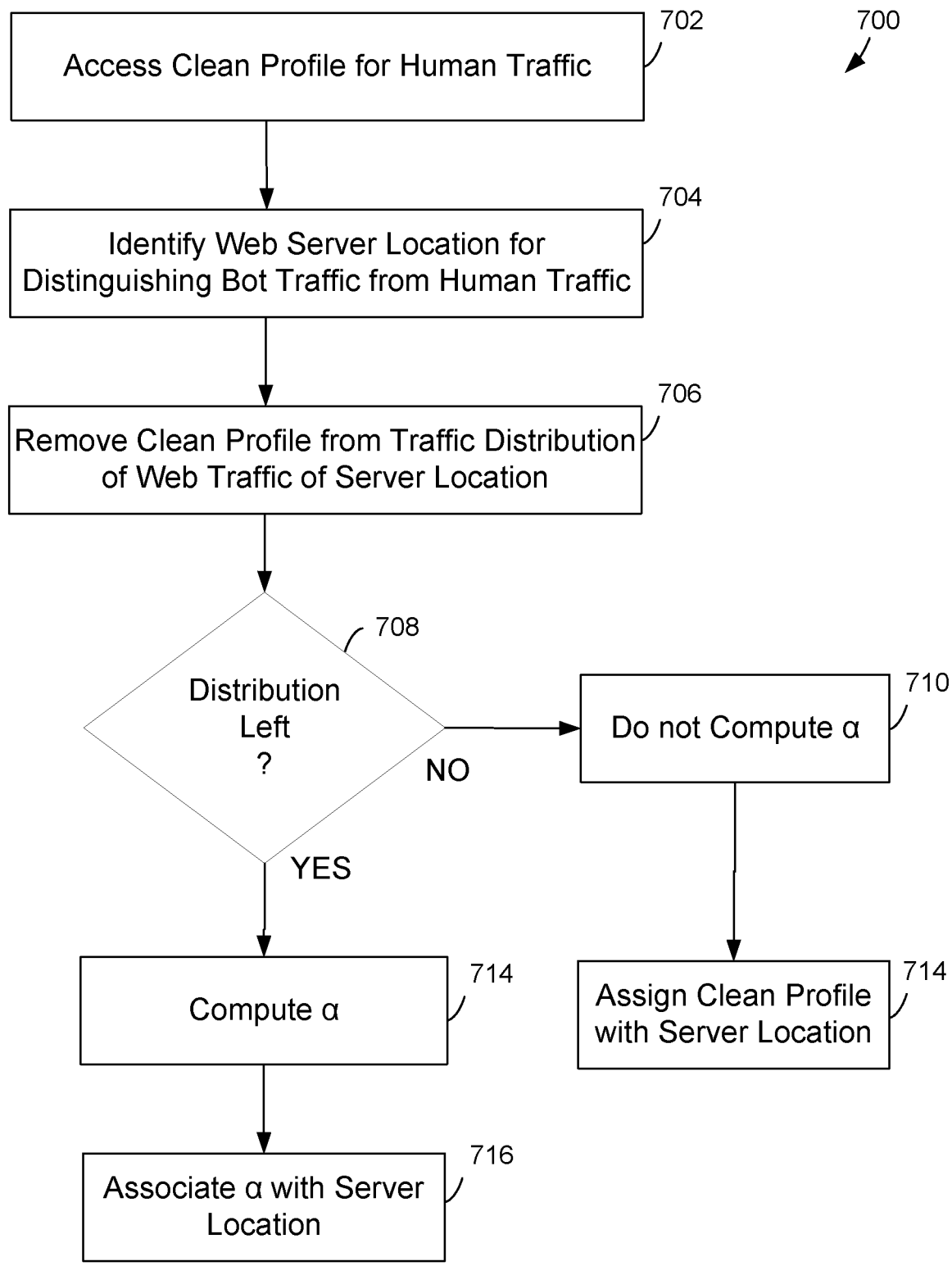
FIG. 7 is a flow chart diagram illustrating a workflow using a clean profile to distinguish between bot and human web traffic at different traffic distribution buckets.

FIG. 7 is a flow chart diagram illustrating a workflow 700 for using a clean profile to distinguish between bot and human web traffic at different server locations. Workflow 700 assumes that the clean profile for identifying human traffic has been determined, for example using workflow 600 discussed above in relation to FIG. 6. Workflow 700 begins by accessing the generated clean profile, as shown at 702. A web server location is identified, as shown at 704. The clean profile is removed (e.g., subtracted) from the traffic distribution of the identified web server location, as shown at 706. For example, if the server location has a distribution indicating 20% of its web traffic originates from IP addressed out of Macon, Ga. and the clean profile identified only 14% out of Macon, Ga., the 14% clean profile is subtracted from the 20% observed traffic distribution.

As shown at decision box 708, once the clean profile is removed, a check (which is optional and is not run in all embodiments) is run to see if the clean profile removed all of the traffic distribution (signifying it was all human traffic) or whether there is any traffic distribution left (signifying there was some bot traffic). If the clean profile encompassed all of the traffic distribution (the NO path), nothing further need be done. The previously discussed ratio a is not calculated, as shown at 710, and the clean profile is assigned to the server location, as shown at 714. But if the observed traffic distribution of the server location includes more than the clean profile (the YES path), the ratio a is computed, as shown at 714, using the following formula:

$$\alpha = O(y_0)/C(y_0);$$

where $O(y_0)$ is the observed distribution for a traffic parameter divided by the same traffic parameter in the clean profile, or $C(y_0)$. This ratio of the amount of clean traffic in the observed traffic is then associated with the server location, as shown at 716. A firewall, IDS, or other security application may then use this association to make determinations on the safety of web traffic sent to the server location.

FIG. 8 illustrates a block diagram of an example cloud-computing environment in which web traffic data is distinguished between human and bot traffic. Cloud environment 800 illustrates an exemplary cloud-computing infrastructure, suitable for use in implementing aspects of this disclosure. Cloud environment 800 should not be interpreted as having any dependency or requirement related to any single component or combination of components illustrated therein. In addition, any number of nodes, virtual machines, data centers, role instances, or combinations thereof may be employed to achieve the desired functionality within the scope of embodiments of the present disclosure.

The distributed computing environment of FIG. 8 includes a public network 802, a private network 804, and a dedicated network 806. Public network 802 may be a public cloud-based network of computing resources, for example. Private network 804 may be a private enterprise network or private cloud-based network of computing resources. And dedicated network 806 may be a third-party network or dedicated cloud-based network of computing resources. In some examples, private network 804 may host a customer data center 810, and dedicated network 812 may host various client applications 812 that a cloud subscriber wishes to keep out of the public network 802.

Hybrid cloud 808 may include any combination of public network 802, private network 804, and dedicated network 806. For example, dedicated network 806 may be optional, with hybrid cloud 808 comprised of public network 802 and private network 804. Along these lines, some customers may opt to only host a portion of their customer data center 810 in the public network 802 and/or dedicated network 806, retaining some of the customers' data or hosting of customer services in the private network 804. Myriad scenarios exist whereby customers may desire or need to keep certain portions of data centers under the customers' own management. Thus, in some examples, customer data centers may use a hybrid cloud 808 in which some data storage and processing is performed in the public network 802 while other data storage and processing is performed in the dedicated network 806.

Public network 802 may include data centers configured to host and support operations, including tasks of a distributed application, according to the fabric controller 818. It will be understood and appreciated that data center 814 and data center 816 are merely examples of suitable implementations for accommodating one or more distributed applications, and are not intended to suggest any limitation as to the scope of use or functionality of examples disclosed herein. Neither should data center 814 and data center 816 be interpreted as having any dependency or requirement related to any single resource; combination of resources, combination of servers (e.g., servers 820 and 824); combination of nodes (e.g., nodes 832 and 834), or a set of application programming interfaces (APIs) to access the resources, servers, and/or nodes.

Data center 814 illustrates a data center comprising a plurality of servers, such as servers 820 and 824. A fabric controller 818 is responsible for automatically managing the servers 820 and 824 and distributing tasks and other resources within the data center 814. By way of example, the fabric controller 818 may rely on a service model (e.g., designed by a customer that owns the distributed application) to provide guidance on how, where, and when to configure server 822 and how, where, and when to place web application 826 and web application 828 thereon. One or more role instances of a distributed application may be placed on one or more of the servers 820 and 824 of data center 814, where the one or more role instances may represent the portions of software, component programs, or instances of roles that participate in the distributed application. In other examples, one or more of the role instances may represent stored data that are accessible to the distributed application.

Data center 816 illustrates a data center comprising a plurality of nodes, such as node 832 and node 834. One or more virtual machines may run on nodes of data center 816, such as virtual machine 836 of node 834 for example. Although FIG. 8 depicts a single virtual node on a single node of data center 816, any number of virtual nodes may be implemented on any number of nodes of the data center in accordance with illustrative embodiments of the disclosure. Generally, virtual machine 836 is allocated to role instances of a distributed application, or service application, based on demands (e.g., amount of processing load) placed on the distributed application. As used herein, the phrase "virtual machine" is not meant to be limiting, and may refer to any software, application, operating system, or program that is executed by a processing unit to underlie the functionality of the role instances allocated thereto. Further, the virtual machine(s) 836 may include processing capacity, storage locations, and other assets within the data center 816 to properly support the allocated role instances.

In some examples, the traffic classifier 208 discussed above is accessible in the public network 802, for instance as a standalone application or as part of a firewall or IDS related of the data centers 814 or 814. As previously discussed, the traffic classifier 208 analyzes traffic parameters associated with web traffic to the various web applications, websites, or other online resources in the public network 802. Clean profiles, ratios of clean and bot traffic request (a), and probability scores of the likelihood that new web traffic is malicious or legit In operation, the virtual machines are dynamically assigned resources on a first node and second node of the data center, and endpoints (e.g., the role instances) are dynamically placed on the virtual machines to satisfy the current processing load. In one instance, a fabric controller 830 is responsible for automatically managing the virtual machines running on the nodes of data center 816 and for placing the role instances and other resources (e.g., software components) within the data center 816. By way of example, the fabric controller 830 may rely on a service model (e.g., designed by a customer that owns the service application) to provide guidance on how, where, and when to configure the virtual machines, such as virtual machine 836, and how, where, and when to place the role instances thereon.

As discussed above, the virtual machines may be dynamically established and configured within one or more nodes of a data center. As illustrated herein, node 832 and node 834 may be any form of computing devices, such as, for example, a personal computer, a desktop computer, a laptop computer, a mobile device, a consumer electronic device, a server, the computing device 100 of FIG. 1, and the like. In one instance, the nodes 832 and 834 host and support the operations of the virtual machine(s) 836, while simultaneously hosting other virtual machines carved out for supporting other tenants of the data center 816, such as internal services 838 and hosted services 840. Often, the role instances may include endpoints of distinct service applications owned by different customers.

Typically, each of the nodes include, or is linked to, some form of a computing unit (e.g., central processing unit, microprocessor, etc.) to support operations of the component (s) running thereon. As utilized herein, the phrase "computing unit" generally refers to a dedicated computing device with processing power and storage memory, which supports operating software that underlies the execution of software, applications, and computer programs thereon. In one instance, the computing unit is configured with tangible hardware elements, or machines, that are integral, or operably coupled, to the nodes to enable each device to perform a variety of processes and operations. In another instance, the computing unit may encompass a processor (not shown) coupled to the computer-readable medium (e.g., computer storage media and communication media) accommodated by each of the nodes.

The role of instances that reside on the nodes may be to support operation of service applications, and thus they may be interconnected via APIs. In one instance, one or more of these interconnections may be established via a network cloud, such as public network 802. The network cloud serves to interconnect resources, such as the role instances, which may be distributed across various physical hosts, such as nodes 832 and 834. In addition, the network cloud facilitates communication over channels connecting the role instances of the service applications running in the data center 816.

ADDITIONAL EXAMPLES

Some examples are directed to a system configured for distinguishing bot traffic from legitimate traffic. The system includes memory storing executable instructions for determining a clean profile indicative of human web traffic from web traffic received at a plurality of server locations. The system also includes one or more processors programmed to: access traffic distributions associated with the web traffic received at the plurality of server locations, the traffic distributions comprising a representation of one or more traffic parameters associated with the web traffic; compare at least two of the traffic distributions from different server locations; generate the clean profile for human web traffic based on similarities of the at least two of the compared traffic distributions for use in determining whether bot traffic is being received at the server locations.

In some embodiments, the web traffic HTTP requests.

In some embodiments, the one or more traffic parameters comprise at least one of a user agent, time of day, or geographic location.

In some embodiments, the user agent comprises a browser and a browser version of an HTTP request.

In some embodiments, the one or more processors are further programmed to compare first web traffic received at a first of the plurality of server locations to the clean profile to determine a quantity of bot traffic in the first web traffic at the first of the plurality of servers locations.

In some embodiments, the one or more processors are further programmed to determine a ratio of human traffic to bot traffic in a set of web traffic at a first server location based on a comparison of traffic parameters of the set of web traffic in comparison to the clean profile.

In some embodiments, the one or more processors are further programmed to calculate a probability that new web traffic at the first server location is human or bot traffic based on the determined ratio of human traffic to bot traffic in the set of web traffic at the first server location.

In some embodiments, the one or more processors are further programmed to block or prioritize processing of the new web traffic at the first server based on the calculated probability that the new web traffic is human or bot traffic.

In some embodiments, the similarities used to generate the clean profile comprise the at least two of the traffic distributions having a common traffic parameter within a threshold up to 10% of each other.

In some embodiments, the similarities used to generate the clean profile comprise the at least two of the traffic distributions having a same traffic.

Additional aspects are directed to a method with operations for: accessing traffic distributions associated with web traffic received at a plurality of server locations, the traffic distributions comprising a representation of one or more traffic parameters associated with the web traffic received at the plurality of server locations; comparing at least two of the traffic distributions from different server locations; generating a clean profile for human web traffic based on similarities of the at least two of the compared traffic distributions for use in determining whether bot traffic is being received at the server locations; and comparing first web traffic received at a first of the plurality of server locations to the clean profile to determine a quantity of bot traffic in the first web traffic at the first of the plurality of servers locations.

In some embodiments, the similarities of the at least two of the compared traffic distributions having the same values for at least one of the one or more traffic parameter.

In some embodiments, each of the plurality of server locations comprise one or more servers for processing the web traffic.

In some embodiments, web traffic determined to be bot traffic is blocked. Alternatively, human traffic may be prioritized for processing.

Additional aspects are directed to computer storage memory embodying a profile learning module executable by at least one processor for: accessing traffic distributions associated with web traffic received at a plurality of server locations, the traffic distributions comprising one or more traffic parameters associated with the web traffic received at the plurality of server locations; identifying at least two of the traffic distributions from different server locations having similar quantities or percentages of the one or more traffic parameters; and generating a clean profile for identifying human web traffic based on the similarities of the at least two of the traffic distributions of the one or more traffic parameters.

In some embodiments, a ratio calculator is executable for: comparing the clean profile to a first set of the traffic parameters for a first set of the web traffic received at a first server location; determining a quantity of the first set of the web traffic as bot traffic using the clean profile; and generating a ratio of the clean traffic to the bot traffic in the first set of the web traffic based on the quantity of bot traffic in the first set of the web traffic.

Some embodiments include a probability calculator that is executable for: comparing the clean profile to a first set of the web traffic received at a first server location; determining a quantity of the first set of the web traffic as bot traffic using the clean profile; and generating a ratio of the clean traffic to the bot traffic in the first set of the web traffic based on the determined bot traffic.

While the aspects of the disclosure have been described in terms of various examples with their associated operations, a person skilled in the art would appreciate that a combination of operations from any number of different examples is also within scope of the aspects of the disclosure.

Although described in connection with an example computing device 100, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, VR devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media devices and communication media. Computer storage media devices include volatile and nonvolatile, removable and non-removable memory implemented in any method or technology for storage of information such as computer readable instructions, data structures, program modules, or the like. Computer storage media devices are tangible and mutually exclusive to communication media. Computer storage media devices are implemented in hardware and exclude carrier waves and propagated signals. Computer storage media devices for purposes of this disclosure are not signals per se. Example computer storage media devices include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media typically embody computer readable instructions, data structures, program modules, or the like in a modulated data signal such as a carrier wave or other transport mechanism and include any information delivery media.

The order of execution or performance of the operations in examples of the disclosure illustrated and described herein is not essential, and may be performed in different sequential manners in various examples. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system, comprising:
   memory storing executable instructions for determining a clean profile indicative of human web traffic from web traffic received at a plurality of server locations; and
   one or more processors programmed to:
     access traffic distributions associated with the web traffic received at the plurality of server locations, the traffic distributions comprising a representation of one or more traffic parameters associated with the web traffic,
     compare a plurality of traffic parameters of at least two of the traffic distributions from different server locations to machine learn the clean profile based on the same plurality of traffic parameters being found at the two or more server locations, and
     generate the clean profile for human web traffic based on the compared traffic distributions for use in determining whether bot traffic is being received at the server locations.

2. The system of claim 1, wherein the web traffic comprises hypertext transfer protocol (HTTP) requests.

3. The system of claim 1, wherein the one or more traffic parameters comprise at least one of a user agent, time of day, or geographic location.

4. The system of claim 1, wherein the user agent comprises a browser and a browser version of an hypertext transfer protocol (HTTP) request.

5. The system of claim 1, wherein the one or more processors are further programmed to compare first web traffic received at a first of the plurality of server locations to the clean profile to determine a quantity of bot traffic in the first web traffic at the first of the plurality of server locations.

6. The system of claim 1, wherein the one or more processors are further programmed to determine a ratio of human traffic to bot traffic in a set of web traffic at a first server location based on a comparison of traffic parameters of the set of web traffic in comparison to the clean profile.

7. The system of claim 6, wherein the one or more processors are further programmed to calculate a probability that new web traffic at the first server location is human or bot traffic based on the determined ratio of human traffic to bot traffic in the set of web traffic at the first server location.

8. The system of claim 7, wherein the one or more processors are further programmed to block or prioritize processing of the new web traffic at the first server based on the calculated probability that the new web traffic is human or bot traffic.

9. The system of claim 1, wherein the similarities used to generate the clean profile comprise the at least two of the traffic distributions having a common traffic parameter within at least 10% of each other.

10. The system of claim 1, wherein the similarities used to generate the clean profile comprise the at least two of the traffic distributions having a same traffic.

11. A method, comprising:
accessing traffic distributions associated with web traffic received at a plurality of server locations, the traffic distributions comprising a representation of one or more traffic parameters associated with the web traffic received at the plurality of server locations;
comparing a plurality of traffic parameters of at least two of the traffic distributions from different server locations to machine learn a clean profile based on the same plurality of traffic parameters being found at the two or more server locations;
generating the clean profile for human web traffic based on the compared traffic distributions for use in determining whether bot traffic is being received at the server locations; and
comparing first web traffic received at a first of the plurality of server locations to the clean profile to determine a quantity of bot traffic in the first web traffic at the first of the plurality of server locations.

12. The method of claim 11, wherein the similarities of the at least two of the compared traffic distributions having the same values for at least one of the one or more traffic parameter.

13. The method of claim 11, wherein the one or more traffic parameters comprise at least one of a user agent, a time of day, and a geographic location associated with the web traffic.

14. The method of claim 11, wherein the web traffic comprises Hypertext Transfer Protocol (HTTP) requests.

15. The method of claim 11, wherein each of the plurality of server locations comprise one or more servers for processing the web traffic.

16. The method of claim 11, further comprising blocking web traffic determined to be bot traffic.

17. One or more computer storage media embodying computer-executable components, said components comprising:
a profile learning module executable by at least one processor for:
accessing traffic distributions associated with web traffic received at a plurality of server locations, the traffic distributions comprising one or more traffic parameters associated with the web traffic received at the plurality of server locations,
identifying a plurality of traffic parameters of at least two of the traffic distributions from different server locations to machine learn a clean profile based on the same plurality of traffic parameters being found at the two or more of server locations, and
generating the clean profile for identifying human web traffic based on the traffic distributions of the one or more traffic parameters.

18. The one or more computer storage media of claim 17, wherein the similar quantities or percentages comprise the at least two of the traffic distributions being within at least 10% of each other.

19. The one or more computer storage media of claim 17, further comprising:
a ratio calculator executable by the at least one processor for:
comparing the clean profile to a first set of the traffic parameters for a first set of the web traffic received at a first server location;
determining a quantity of the first set of the web traffic as bot traffic using the clean profile; and
generating a ratio of the clean traffic to the bot traffic in the first set of the web traffic based on the quantity of bot traffic in the first set of the web traffic.

20. The one or more computer storage media of claim 17, further comprising:
a probability calculator executable by the at least one processor for:
comparing the clean profile to a first set of the web traffic received at a first server location;
determining a quantity of the first set of the web traffic as bot traffic using the clean profile; and
generating a ratio of the clean traffic to the bot traffic in the first set of the web traffic based on the determined bot traffic.

* * * * *